United States Patent [19]

Barlow et al.

[11] Patent Number: 4,667,727
[45] Date of Patent: * May 26, 1987

[54] METHOD OF SQUEEZE FORMING METAL ARTICLES

[75] Inventors: John Barlow, Willenhall; David B. Rogers, East Harling, both of England

[73] Assignee: GKN Technology Limited, Wolverhampton, England

[*] Notice: The portion of the term of this patent subsequent to Feb. 18, 2003 has been disclaimed.

[21] Appl. No.: 803,067

[22] PCT Filed: Apr. 2, 1985

[86] PCT No.: PCT/GB85/00140
§ 371 Date: Nov. 18, 1985
§ 102(e) Date: Nov. 18, 1985

[87] PCT Pub. No.: WO85/04605
PCT Pub. Date: Oct. 24, 1985

Related U.S. Application Data

[63] Continuation-in-part of Ser. No. 681,997, Dec. 7, 1984, Pat. No. 4,570,693.

[30] Foreign Application Priority Data

Apr. 7, 1984 [GB] United Kingdom ................. 8409044

[51] Int. Cl.⁴ ...................... B22D 18/02; B22D 19/02; B22D 19/14
[52] U.S. Cl. ....................................... 164/97; 164/98; 164/112; 164/120; 164/132
[58] Field of Search ................. 164/98, 112, 120, 132, 164/520, 522, 97

[56] References Cited

U.S. PATENT DOCUMENTS

| 3,439,732 | 4/1969 | Andreoli | 164/112 |
| 3,459,253 | 8/1969 | Woolcott | 164/132 X |
| 3,801,334 | 4/1974 | Dewey, Jr. | 164/522 X |
| 3,963,818 | 6/1976 | Sakoda et al. | 264/56 |
| 4,279,289 | 7/1981 | Ban et al. | 164/120 X |
| 4,334,507 | 6/1982 | Kohnert et al. | 164/120 X |
| 4,446,906 | 5/1984 | Ackerman et al. | 164/112 |
| 4,480,681 | 11/1984 | Alexander et al. | 164/132 X |
| 4,491,168 | 1/1985 | Snee | 164/98 |
| 4,570,693 | 2/1986 | Barlow | 164/120 X |

FOREIGN PATENT DOCUMENTS

| 2011343 | 2/1970 | France | 164/98 |
| 2106433A | 4/1983 | United Kingdom | 164/98 |
| 2123727A | 2/1984 | United Kingdom | |

Primary Examiner—Nicholas P. Godici
Assistant Examiner—J. Reed Batten, Jr.
Attorney, Agent, or Firm—Marshall, O'Toole, Gerstein, Murray & Bicknell

[57] ABSTRACT

A squeeze formed aluminium alloy article, such as a piston, is formed with a re-entrant cavity (14) with reinforced edges by locating an isostatically compacted salt core (10) and annular alumina-silicate fibre pad (11) in the mould cavity of the squeeze forming press prior to introduction of the molten metal therein. The core (10) is subsequently dissolved from the squeeze formed article to provide a reinforced corresponding shape to the article which does not require subsequent machining.

12 Claims, 8 Drawing Figures

METHOD OF SQUEEZE FORMING METAL ARTICLES

This application is a continuationin-part of copending U.S. patent application Ser. No. 681,997, filed Dec. 7, 1984, now U.S. Pat. No. 4,570,693 granted Feb. 18, 1986, the entire contents of which is incorporated herein by reference.

This invention relates to the manufacture of articles by the technique known variously as squeeze forming, squeeze casting or extrusion casting which for the sake of convenience throughout this specification and claims will be referred to as "squeeze forming". Basically the technique of squeeze forming comprises introducing liquid metal into a first part of a mould, closing the mould under pressure so that the liquid metal is displaced by the mould closure to fill a cavity within the mould without entrapping air, maintaining the metal under pressure whilst solidification takes place so as to ensure that any shrinkage cavities which may form are closed and filled, and then opening the mould and removing the formed article.

It is known to prodice various squeeze formed articles, usually of aluminium or aluminium alloys, but such articles have generally been of a fiarly simple shape. Thus where a more complex shape is required it has generally been necessary to achieve such shape by some form of machining operation subsequent to manufacture of the squeeze formed article.

However, co-pending U.S. patent application Ser. No. 681,997 filed Dec. 7, 1984, now U.S. Pat. No. 4,570,693. discloses and claims a method of manufacturing a metal article by squeeze forming wherein a required shape is produced in the as-formed article which shape does not require subsequent machining. The required shape, as disclosed in the aforesaid patent application, is achieved by locating a shape compacted soluble salt core in a mould part of the squeeze forming press prior to the introduction of molten metal thereto, the core being compacted to such a density that it will have sufficient integrity to resist the pressures to which it is subjected during the squeeze forming operation and having such a surface finish as to form a corresponding surface in the squeeze formed article which will not require any subsequent machining. Specifically, the compacted soluble salt core is shaped to form a re-entrant bowl in the crown of an internal combustion engine piston.

In connection with the squeeze forming of internal combustion engine pistons produced by methods other than those disclosed in the aforesaid U.S. Pat. No. 4,570,693, it has been proposed to reinforce the crown region around the edges of the bowl. These other methods have comprised the location of a reinforcement insert in the squeeze forming press on to which the molten metal is poured so that in the as-formed piston the reinforcement insert is incorporated in the piston crown at the crown surface. The reinforcement material, which may be a solid metal block or a mat of whiskers or fibres, then has to be machined in the as-formed piston to a required shape of bowl in the finished piston.

It is an object of the present invention to provide an improved method of manufacturing an article by squeeze forming whereby a complex shape may be provided to the article without the necessity of extensive subsequent machining and wherein such shape is selectively reinforced at those areas thereof susceptible to operational requirements of reinforcement.

In accordance with the invention there is provided a method of manufacturing a light metal article by squeeze forming molten metal in a mould wherein the molten metal is introduced into the mould, the mould is closed under pressure to displace molten metal to fill a cavity in the mould and the metal is maintained under pressure whilst solidification thereof takes place, the mould subsequently being opened and the formed article removed characterised in that a required shape is formed in the squeeze formed article with reinforcement in the metal matrix of the article extending to at least part of a boundary of said shape by locating a core and a reinforcement insert adjacent said core in the mould prior to the introduction of molten metal thereto and in that the core comprises a soluble salt core compacted to such a density and surface finish that it retains its integrity under the conditions of sustained temperature and pressure transmitted thereto by the metal during the squeeze forming operation; the core subsequently being dissolved from the squeeze formed article.

The term 'reinforcement' as used throughout this specification and claims will be understood to refer to reinforcement in the sense of reinforcement against, e.g. stress cracking as well as in the sense of reinforcement by the provision of wear-resistance.

Conveniently such a shaped soluble core and reinforcement insert can be utilized to provide a re-entrant recess or through bore in the squeeze formed article. By way of example, such core and reinforcement may be shaped to provide a re-entrant bowl in the crown of an internal combustion engine piston or, again, by way of example, such core and reinforcement insert may be shaped to provide a through bore in a link of an endless track assembly; the whole or parts of the edges of the bowl or through bore as the case may be being reinforced by the reinforcement insert material.

The said salt core is conveniently compacted either to the required shape solely by isostatic compaction, or substantially to the required shape solely by isostatic compaction and is then machined; the molten metal conveniently comprising a light metal such as aluminium, magnesium or an alloy thereof. The reinforcement insert material conveniently comprises an inorganic whisker or fibre pad whereby, during the squeeze forming operation, the molten metal will penetrate the interstices between the whiskers or fibres and said whiskers or fibres will become embedded within the as-formed article adjacent the shaped part of the article formed by the salt core. The whisker or fibre mat may comprise an alumina-silicate material.

The reinforcement insert may be annular and may surround the shaped salt core when initially located within the said mould part of the squeeze forming press.

The method of the invention is conveniently applicable to the manufacture of a light metal piston for an internal combustion engine wherein the piston is squeeze formed crown down in a squeeze forming press having a bottom mould part and a cooperating top punch vertically movable relative to one another, the shaped core and the reinforcement insert being located in the bottom mould part and being shaped as to form a bowl having a reinforced edge in the piston crown. Conveniently the core is so shaped as to provide a reentrant bowl configuration in the piston crown.

In order to prevent pick-up of moisture in the salt core, it is preferable to add a desiccant thereto which will thus provide free-flowing characteristics to facilitate a closer packing of the salt during its isostatic compaction ensuring a dense compact. The desiccant may comprise magnesium carbonate or magnesium phosphate in a proportion of approximately 0.1 percent by weight of the core. Obviously a desiccant must be chosen which does not decompose at the forming temperature of the metal which, for aluminium, is within the range 680° C. to 750° C. The salt together with the desiccant is preferred to have all of the following properties:

1. The material must be easily formed to the required shape.
2. The material must be strong enough to withstand handling and the temperature and pressure requirements of the squeeze forming process.
3. The material must be easily soluble (preferably in water) to faciliate removal of the core from the formed article.
4. The solution of the core material should have little or no corrosive attach on the metal.
5. The material should preferably be recoverable for recycling.

It is preferred to use fine grained sodium chloride for the core having a particle size between 5 and 250 microns which material, together with the desiccant, may be readily cold isostatically compacted to the required shape at a pressure of approximately 30,000 p.s.i. (207 MPa). It is not necessary to carry out any subsequent sintering operation on the isostatically compacted salt and desiccant core.

Additionally, it is preferable to add an expansion modifying agent to the core material in order to reduce, or eliminate, the incidence of thermal stress cracking in the salt during the squeeze-forming operation. Such an expansion modifying agent may comprise, for example, aluminium oxide, glass powder, a copper alloy infiltrant, graphite, talc or fine alumina-silicate fibres.

Other features of the invention will become apparent from the following description given herein solely by way of example with reference to the accompanying drawings wherein.

Although the method of the invention is applicable to the squeeze forming of any metal article having a required, usually complex, shape to be formed therein without the necessity for subsequent machining of such shape, the following description is given only with reference to the drawings which relate to the production of a piston for an internal combustion engine. Such a piston is usually formed of aluminium or an alloy thereof although it may also be formed of magnesium or an alloy thereof.

The piston is formed in a squeeze forming press (not illustrated) which will usually comprise a bottom mould part and a cooperating top punch vertically movable relative to one another. The bottom mould part may be stationary and the top punch may be reciprocable into and out of cooperation with the bottom mould part which itself may include two or more laterally movable mould parts securable in closed relation with one another to define a mould cavity with the bottom mould part. In the embodiment illustrated herein, the piston includes two ferrous expansion inserts incorporated in the squeeze formed piston and, during the squeeze forming operation, such expansion inserts may conveniently be located on the top punch by means of botton magnets embedded within the punch on the side walls thereof.

The salt core 10 is formed by cold isostatic compaction in a urethane or rubber elastomeric bag in a liquid to which pressure is applied of approximately 30,000 p.s.i. (207 MPa) The salt is fine grained sodium chloride having a particle size of between 5 and 250 microns and is mixed with a desiccant material which may comprise magnesium carbonate or magnesium phosphate. An expansion modifying agent is also added to the mixture, such agent comprising, for example, aluminium oxide, glass powder, a copper alloy infiltrant, graphite, talc or fine alumina-silicate fibres. By this process of cold isostatic compaction a shaped salt core may be readily formed to the configuration shown in FIG. 1 of the drawings and will have sufficient integrity to resist the sustained temperature and pressure to which it is subjected during the squeeze forming operation and will have such a surface finish as to form a corresponding shaped surface in the squeeze formed piston which will not require any subsequent machining.

Figure 1:
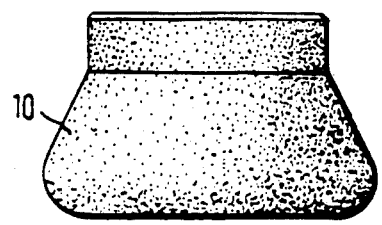
FIG. 1 is a side elevation of a shaped isostatically compacted salt core for forming a re-entrant bowl in a piston crown.

The core 10 illustrated in FIG. 1 is isostatically compacted to its required final shape without the need of any subsequent machining operation. However, depending upon the complexity of the shape required, it may be necessary to compact the core material substantially to shape and then to carry out a subsequent machining operation thereon to bring the core to its required final shape.

The annular reinforcement insert 11 is conveniently formed of an alumina-based material of which the balancing compound may be silica in varying proportions from 2% to 60%. An example of such a material is that which is manufactured by I.C.I. and sold under the trade name "Saffil".

The alumina-based fibres which comprise the reinforcement are typically of mean diameter 2.9 um to 3.5 um; have an aspect ratio (ratio of length: diameter) of from 50:1 to 500:1; and have a density of 2.8 gm/cc to 3.3 gm/cc (depending upon ratio of alumina:silica).

The fibres are conveniently combined to form the annular reinforcement (or any other pre-determined shape) by initially dispersing the fibres in water to which is then added two types of binder, one organic and the other inorganic, together with other additives required to maintain a uniform and efficient deposition of the said binders on the fibres when the suspension is filtered through a screen to produce a coherent pad and during the subsequent stages of compression and drying. Whilst still wet, the pad may be compressed to achieve a closer packing of the fibres and thus increase the volume fraction of reinforcement in the final metal fibre composite.

Collection of the fibre by filtration through a screen causes it to be arranged in an essentially two-dimensional random fashion with the preferred orientations parallel to the large faces of the pad. It is this packing which enables high volume fractions of the fibre to be achieved in the final composite. The array also confers anisotropic properties on the metal when the pad is incorporated.

The inorganic binder may be any of those known in the art for the production of rigid and semi-rigid structures based on inorganic fibres. A preferred inorganic binder is silica because it remains essentially in position during the squeeze-forming operation and may enhance the wettability and ease of penetration of the liquid metal. The organic binder may be any of those known in the art for the production of flexible and semi-rigid structures and one such binder is latex. The purpose of the organic binder is to improve handling strength. For example, good handling strength minimises the risk of damage during transport of the disks or pads from which the disks are subsequently cut and also during the cutting operation. Such organic binder can be burned out at any stage prior to introducing the insert to the squeeze-forming mould and such burning out will not only remove the organic binder but will also improve the strength of bond between the inorganic binder and the fibre.

Figure 2:
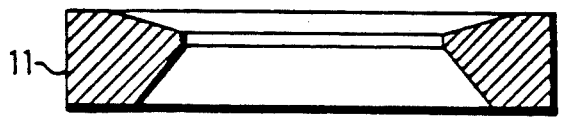
FIG. 2 is a longitudinal cross sectional view of an annular reinforcement insert.

The core 10 of FIG. 1 is located within the insert 11 of FIG. 2 in the bottom mould part of the squeeze forming press, the expansion inserts are magnetically secured to the top punch, the laterally movable bottom mould parts are locked together and molten aluminium is then metered into the mould cavity. The top punch is then brought into cooperating engagement with the mould cavity to displace the molten aluminium to fill the cavity defined between the punch and the bottom mould part and the aluminium is maintained under pressure of approximately 10,000 p.s.i. (70 MPa) whilst solidification takes place. The mould is then opened, the squeeze formed piston is removed and the shaped salt core is dissolved from the piston by, for example, jetting with warm water.

Figure 3:
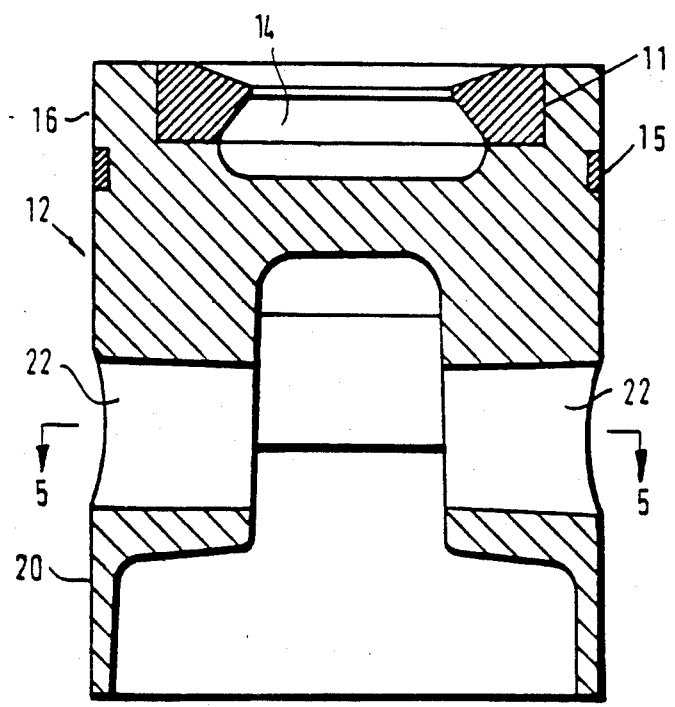
FIG. 3 is a longitudinal cross sectional view of an aluminium squeeze formed piston in the as-formed condition showing the re-entrant bowl with a reinforced edged formed by the core of FIG. 1 and the insert of FIG. 2.
Figure 4:
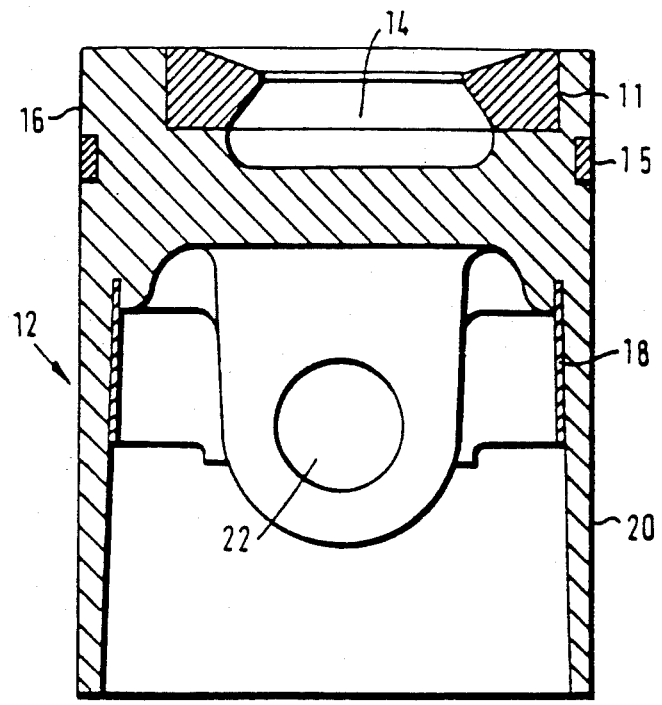
FIG. 4 is a similar longitudinal cross sectional view to that shown in FIG. 3 but taken at 90° thereto.
Figure 5:
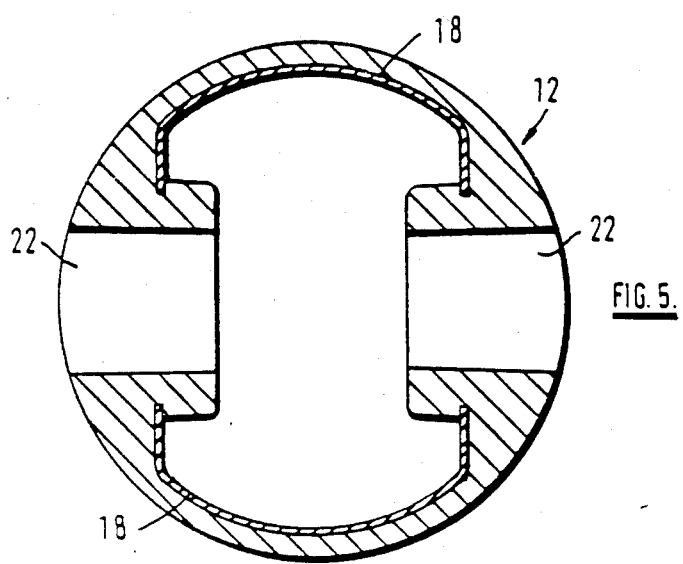
FIG. 5 is a transverse cross sectional view on the line 5—5 of FIG. 3 but showing both halves of the piston rather than one-half.

The as-formed piston 12 is shown in FIGS. 3, 4 and 5 of the drawings wherein it will be seen that a re-entrant bowl 14 has been formed in the crown 16 of the piston. The shape and surface finish of this bowl 14 are such as not to require any further machining operations to be carried out thereon. Also, as will be clearly seen from FIGS. 4 and 5, the ferrous expansion inserts 18 are incorporated in the skirt portion 20 of the piston. Also as will be particularly seen from FIG. 3, diametrically opposed bores 22 are formed in the skirt portion 20 (formed by appropriate core rods in the laterally movable mould portions of the squeeze forming press) at the location at which a through bore is to be machined from the reception of a gudgeon pin.

Also, as shown in FIGS. 3 and 4, the as-formed piston 12 is provided with a further annular insert 15 in the crown region. This insert 15 may conveniently be formed of the same material and by a similar method as the insert 11 although the density of the insert 15 may be less than that of the insert 11. Typically, the density of the insert 15 may be 0.2 gms/cc whilst the density of the insert 11 may be 0.5 gms/cc. The insert 15 is intended to provide, when machined, a wear-resistant carrier groove for a piston ring whereas the insert 11 is intended to be primarily by way of reinforcement for the edge of the bowl 14 and will not require any subsequent machining from the initially formed shape of FIG. 2.

During the squeeze forming operation, the molten metal will completely penetrate the interstices between the fibres of the inserts 11 and 15 so that the fibres are fully embedded within the solidified metal of the as-formed piston.

Figures 6, 7:
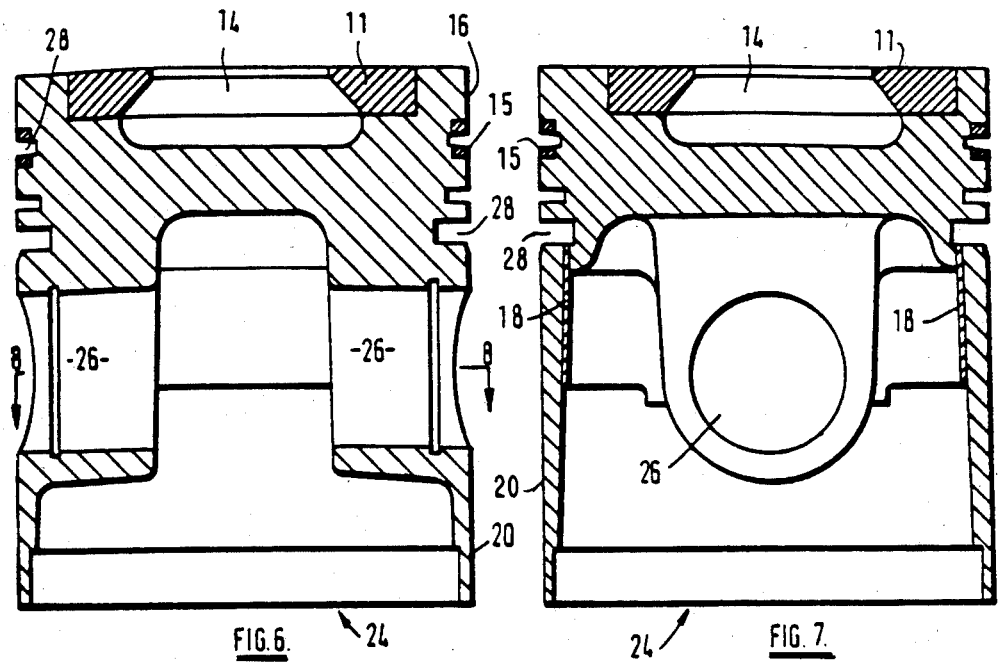
FIG. 6 is a longitudinal cross sectional view taken in the same direction as that of FIG. 3 but showing the finished piston after machining.
FIG. 7 is a similar longitudinal cross sectional view of the finished piston of FIG. 6 taken at 90° thereto and FIG. 8 is a transverse cross sectional view on the line 8—8 of FIG. 6 but showing both halves of the piston rather than one-half.
Figure 8:
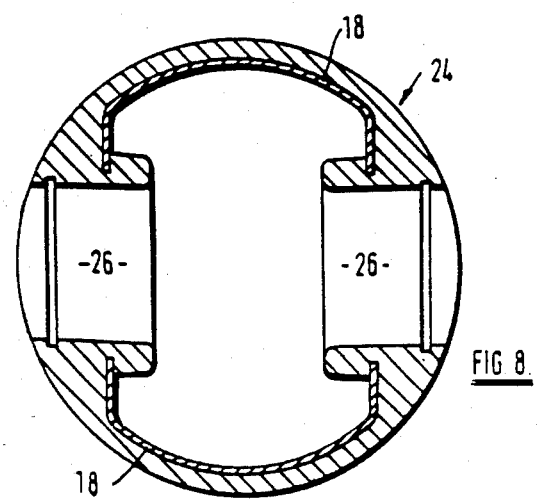

FIGS. 6 to 8 illustrate the fully finished machined piston 24 wherein the through bore 26 for receiving the gudgeon pin has been formed and piston ring grooves 28 have been cut into the peripheral surface of the crown region and into the exposed surface of the insert 15. A skimming operation has also been applied to the top surface of the crown 16 and the insert 11 but the actual re-entrant bowl 14 has not been machined at all.

The invention thus permits, in particular, the formation of a re-entrant bowl with reinforced edges in the crown of an as-formed piston without any necessity of subsequent machining of either the bowl or the reinforcement insert. Thus a substantial re-entrant angle may be provided to the bowl with that area thereof which would be prone to operational stress cracking, i.e. the bowl edge, being adequately reinforced against such cracking.

It will be appreciated that, in the as-formed piston, a thin "skin" of metal may overlie the reinforcement insert at that part of the surface of the piston bowl where the reinforcement is located. In other words, the fibres of the insert may not be exposed at the bowl surface whereas, if the bowl and insert were machined after incorporation of the insert into the piston at the bowl region, cut or broken fibre ends would be exposed creating an uneven exposed surface of the reinforcement. In a piston bowl, the presence of an uneven surface may adversely affect the swirl characteristics which can of course be critical to the combustion performance of the engine.

It will be appreciated that the invention is not restricted to the formation of the particular reinforced reentrant bowl configuration shown in the accompanying drawings although the invention does find particular application in the squeeze forming of internal combustion engine pistons to the shape illustrated and described. Thus, many shapes can be provided to a squeeze formed article by the provision of a suitably shaped compacted soluble salt core and reinforcement or wear resistant insert which will not chemically attack the metal to be squeeze formed and which will be of sufficient integrity and surface finish to withstand the pressures incurred during the squeeze forming operation and will form a shape with reinforced or wear resistant edges in the formed article which will not require any subsequent machining.

For example, a through bore could be provided in a squeeze formed link of an endless track assembly by providing a cylindrical shape of soluble core material and insert material within the mould cavity prior to the introduction of the molten metal therein. Alternatively, a saving may be made on the use of the soluble core material for the provision of a cylindrical through bore in a formed article by providing the soluble core material as a coating around a metal tube; the soluble coating subsequently being dissolved from the squeeze formed article thereby permitting the smaller diameter metal tube to be extracted.

We claim:

1. A method of manufacturing a light metal article having a formed shape therein comprising:

placing a core and a preformed reinforcement insert adjacent and in contact with the core in a cavity of a mould prior to introduction of molten light metal into the mould;

the core comprising a soluble salt core of a fine grained salt mixture;

introducing molten light metal into the mould cavity, closing the mould under pressure to displace molten metal into the cavity and maintaining the metal under pressure whilst solidification thereof takes place to produce a squeeze formed light metal article having a formed shape;

opening the mould and removing the squeeze formed light metal article having a formed shape therein;

the formed shape being partially defined by a volume of reinforced light metal adjacent a volume of unreinforced light metal;

both the volume of reinforced light metal and the volume of unreinforced light metal defining a common boundary which ends at an external surface of the formed shape predetermined to require reinforcement to meet operational conditions; and dissolving the core from the article.

2. A method according to claim 1 wherein the reinforcement insert is annular and surrounds the shaped salt core.

3. A method according to claim 1 wherein the reinforcement insert comprises an inorganic whisker or fibre pad whereby the molten metal will penetrate the interstices between the whiskers or fibres and said whiskers or fibres will become embedded within the article adjacent the shaped part of the article formed by the salt core.

4. A method according to claim 3 wherein the whisker or fibre mat comprises an alumina-silicate material.

5. A method according to claim 1 in which the article is a piston for an internal combustion engine, in which:

the mould has a bottom mould part;

the shaped core and the reinforcement insert are located in the bottom mould part and are shaped to form a bowl having a reinforced edge in a piston crown;

a top punch; and the top punch and mould are vertically movable relative to one another whereby a piston is squeeze formed in the mould crown down.

6. A method according to claim 5 wherein the salt core is shaped to provide a re-entrant bowl configuration in the piston crown.

7. A method according to claim 5 wherein the top punch is provided with magnetic holding means for supporting ferrous expansion inserts thereon for incorporation into the squeeze formed piston.

8. A method according to claim 1 in which the formed shape is a bowl and the common boundary ends in the bowl.

9. A method according to claim 8 in which the bowl has a surface partially defined by the reinforced light metal and partially defined by the unreinforced light metal and the bowl surface is an external surface of the article.

10. A method according to claim 9 in which the reinforced light metal contains inorganic fibers as a reinforcement.

11. A method according to claim 10 in which the surface of the bowl has an intergral covering of light metal over the fiber reinforcement.

12. A method according to claim 11 in which the light metal is integral to the reinforced and unreinforced light metal volumes.

* * * * *